Oct. 24, 1967 R. K. DAKIN 3,348,902
OPTICAL SYSTEM FOR PROJECTION MAGNIFIER
Filed March 24, 1964
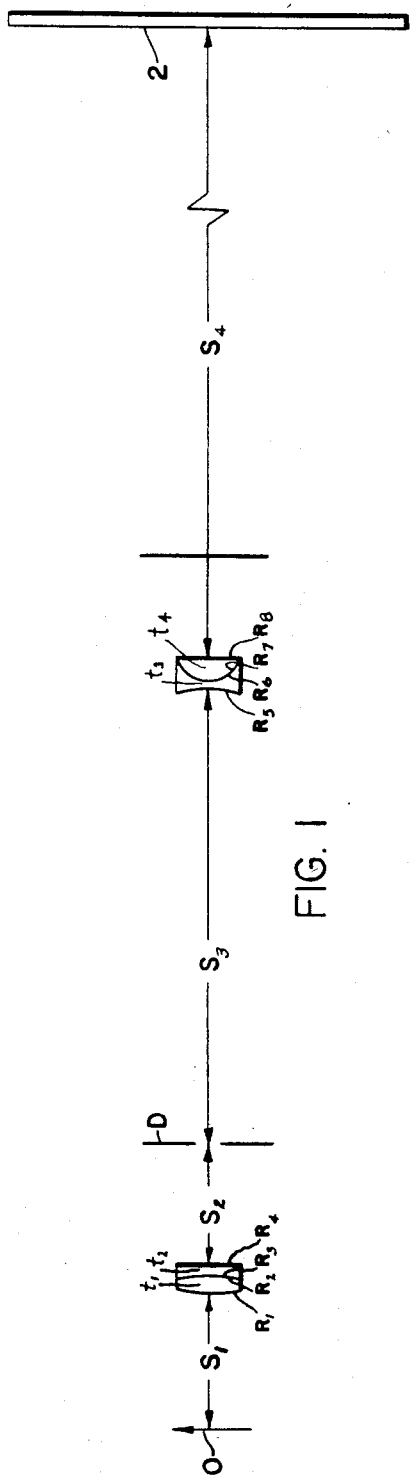
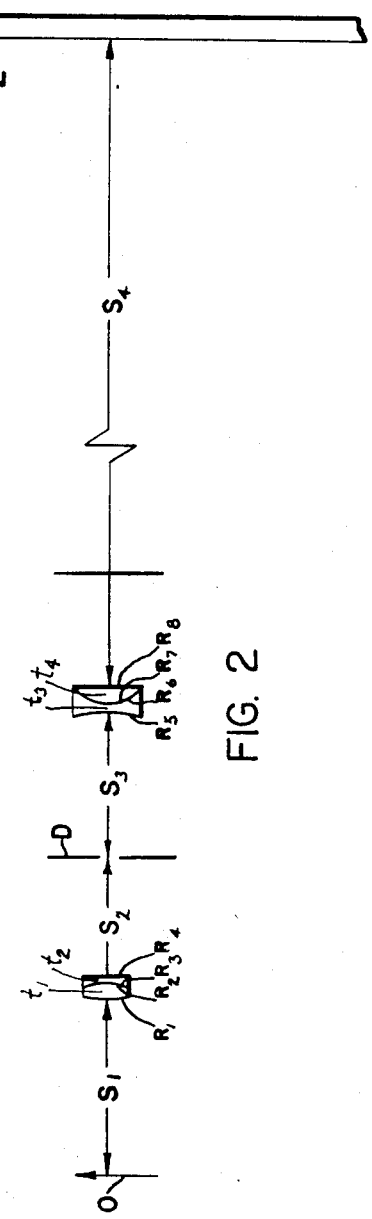
RALPH K. DAKIN
*INVENTOR.*
BY Frank C. Parker
David E. Dougherty
ATTORNEYS

United States Patent Office 3,348,902
Patented Oct. 24, 1967

3,348,902
OPTICAL SYSTEM FOR PROJECTION MAGNIFIER
Ralph K. Dakin, Pittsford, N.Y., assignor to Bausch & Lomb Incorporated, Rochester, N.Y., a corporation of New York
Filed Mar. 24, 1964, Ser. No. 354,378
2 Claims. (Cl. 350—232)

ABSTRACT OF THE DISCLOSURE

A lens system utilizing the combination of two compound two-element lenses, one positive and one negative, each compound lens element being individually corrected for aberrations and combined in such a manner as to give a desired degree of magnification.

--- the final image. The lens assemblies according to the present invention are also fully corrected for spherical aberrations, coma and astigmatism.

A projection lens system according to the present invention is adapted for magnifying the size of a projected image. The system includes a compound positive lens comprising at least two elements, one of the elements being of double convex form, and the other of the elements being of negative meniscus form. A compound negative lens is optically aligned with the compound positive lens and is spaced therefrom by an air space. The compound negative lens includes a double concave element and a second lens element having a convex surface which matches one of the concave surfaces, and a planar surface.

Briefly, the lens systems according to the present invention have the constructional data presented in Table I herebelow.

TABLE I $$-.113 < \Sigma\left(\frac{1}{R_1} \text{ to } \frac{1}{R_8}\right) < -.137$$

| Lens | Radii | Spacing | Thickness | $N_d$ | $\nu$ |
|---|---|---|---|---|---|
| I | $15.85 < R_1 < 17.51$ | $26.6 < S_1 < 35.0$ | $2.38 < t_1 < 2.62$ | $1.5725 \pm .001$ | $57.4 \pm 0.5$ |
|   | $-6.36 < R_2 < -7.02$ | | | | |
| II |  $-6.36 < R_3 < -7.02$ | | $1.04 < t_2 < 1.16$ | $1.6170 \pm .0015$ | $36.6 \pm 0.3$ |
|   | $-38.49 < R_4 < -42.53$ | $20.9 < S_2 < 23.1$ | | | |
|   |   | $26.6 < S_3 < 94.5$ | | | |
| III | $-15.75 < R_5 < -17.41$ | | $.95 < t_3 < 1.05$ | $1.6110 \pm .0015$ | $58.8 \pm 0.5$ |
|    | $9.53 < R_6 < 10.53$ | | | | |
| IV | $9.53 < R_7 < 1.53$ | | $3.8 < t_4 < 4.2$ | $1.6170 \pm .0015$ | $36.6 \pm 0.3$ |
|    | $R_8 + \infty$ | $1038 < S_4 < 1212$ | | | |

This invention relates to a novel optical system and more particularly to an optical system for use in projection magnifiers such as contour projectors or the like.

Contour projectors, microscopes, telescopes and the like normally require precision optical systems. Such systems should be fully corrected for spherical aberrations, coma, astigmatism and distortion so that the quality of the final image is relatively good. Distortion is for example, particularly critical in contour projectors or projection microscopes. Other desirable characteristics for systems of these types include long working distances, short projection distances, a flat field and a minimum of divergent rays at the final image.

Advantageously, the novel optical system according to the present invention forms a real image of an object at finite conjugates. A negative lens is disposed between the image and the positive lens for forming an enlarged real image behind the negative lens. The selection of the components and their conjugates results in a final image of relatively good quality having minimum distortion which approaches zero, and a flat field, while obtaining a long working distance and relatively short projection system. Furthermore, there are a minimum of divergent rays in The minus sign used with the R values denotes lens surfaces which are concave toward the front or object side of the optical system, wherein the power of the systems range from approximately 100× to 200× and the equivalent focal lengths range from 11.7 units for the 100× systems to 5.59 units for the 200× systems.

The invention will now be described in more detail in connection with the accompanying drawings; in which, FIG. 1 is an optical diagram showing a first embodiment of the invention; and FIG. 2 is an optical diagram showing a second embodiment of the invention.

The optical system shown in FIGS. 1 and 2 is particularly applicable for use in a contour projector or the like. Similar reference numerals have been used throughout both figures to designate similar parts. The systems include a succession of four lens elements designated by the Roman numerals I, II, III and IV. The elements are optically aligned to form an image of an object O at the plane of the screen 2.

According to the invention, a compound positive lens including the elements I and II are located serially nearest to and convex toward the object O. The element I defines a double convex surface having radii $R_1$ and $R_2$ respectively and a thickness $t_1$. The element II defines a matching concave surface having a radius of $R_3$ and a second surface having a radius $R_4$. The thickness of the element II is designated by $t_2$.

A compound negative lens including the lens elements III and IV is aligned with the compound positive lens but spaced therefrom by an airspace. The element III which is nearest the element II defines a double concave surface having radii $R_5$ and $R_6$ and a thickness $t_3$. The element IV defines a convex surface $R_7$ which matches the concave surface $R_6$, and a plano surface which is closest to the screen 2. The thickness of the element IV is designated by $t_4$.

The compound positive lens including the elements I, II is spaced from the object plane by a distance $S_1$. $S_2$ designates the distance between the back surface of the element II to a diaphragm D. The distance from the diaphragm D to the concave surface of the element III is represented by $S_3$ so that the summation of $S_2+S_3$ is equal to the airspace distance between the two compound lenses. $S_4$ is equal to the distance from the back surface of the element IV to the screen 2.

The optical system according to the first embodiment of the invention shown in FIG. 1 is illustrated by means of the constructional data set forth in Table II, wherein the radii are represented by $R_1$ to $R_8$, thicknesses are represented by $t_1$ to $t_4$, and successive spacings $S_1$ to $S_4$ are set forth in units. In the preferred embodiments of the invention the units referred to are millimeters.

wherein $N_d$ and $\nu$ are the index of refraction and the reciprocal dispersion ratio. These data may be varied respectively in accordance with the criteria set forth in the table as long as technical compensations are made for such variations.

A first preferred embodiment is set forth in Table III wherein the units of measure are shown in millimeters.

TABLE III $$\sum_{R_1}^{R_8}\left(\frac{1}{R_1}+\frac{1}{R_2}+\cdots\frac{1}{R_8}\right)=-.125$$

| Lens | Radii | Spacing | Thickness | $N_d$ | $\nu$ |
|---|---|---|---|---|---|
| I | $R_1=16.68$ | $S_1=28.0$ | $t_1=2.5$ | 1.5725 | 57.40 |
| II | $R_2=6.69$ $R_3=6.69$ | | $t_2=1.1$ | 1.6170 | 36.6 |
| | $R_4=40.51$ | $S_2=22.0$ $S_3=90.0$ | | | |
| III | $R_5=16.58$ | | $t_3=1.0$ | 1.6110 | 58.8 |
| | $R_6=10.03$ $R_7=10.03$ | | | | |
| IV | $R_8=\infty$ | $S_4=1093$ | $t_4=4.0$ | 1.6170 | 36.6 |

The system set forth in Table III has a power of 200× and an equivalent focal length of 5.59 mm.

TABLE II $$-0.119<\left\{\sum_{R_1}^{R_8}\left(\frac{1}{R_1}+\frac{1}{R_2}+\cdots\frac{1}{R_8}\right)\right\}<-0.131$$

| Lens | Radii | Spacing | Thickness | $N_d$ | $\nu$ |
|---|---|---|---|---|---|
| I | $15.85<R_1<17.51$ | $26.6<S_1<29.4$ | $2.38<t_1<2.62$ | $1.5725\pm.001$ | $57.4\pm0.5$ |
| II | $-6.36<R_2<-7.2$ $-6.36<R_3<-7.2$ $-38.49<R_4<-42.53$ | | $1.04<t_2<1.16$ | $1.6170\pm.0015$ | $36.6\pm0.3$ |
| III | $-15.75<R_5<-17.41$ $9.53<R_6<10.53$ | $20.9<S_2<23.1$ $85.5<S_3<94.5$ | $.95<t_3<1.05$ | $1.6110\pm.0015$ | $58.8\pm0.5$ |
| IV | $9.53<R_7<10.53$ $R_8=\infty$ | $1038<S_4<1148$ | $3.8<t_4<4.2$ | $1.6170\pm.0015$ | $36.6\pm0.3$ |

The optical system shown in FIG. 2 has contructional values according to Table IV.

TABLE IV $$-0.119<\left\{\sum_{R_1}^{R_8}\left(\frac{1}{R_1}+\frac{1}{R_2}+\cdots\frac{1}{R_8}\right)\right\}<0.131$$

| Lens | Radii | Spacing | Thickness | $N_d$ | $\nu$ |
|---|---|---|---|---|---|
| I | $15.85<R_1<17.51$ | $31.6<S_1<35.0$ | $2.38<t_1<2.62$ | $1.5725\pm.001$ | $57.4\pm0.5$ |
| II | $-6.36<R_2<-7.02$ $-6.36<R_3<-7.02$ $-38.49<R_4<-42.53$ | | $1.04<t_2<1.16$ | $1.6170\pm.0015$ | $36.6\pm0.3$ |
| III | $-15.75<R_5<-17.41$ $9.53<R_6<10.53$ | $20.9<S_2<23.1$ $26.6<S_3<29.4$ | $.95<t_3<1.05$ | $1.6110\pm.0015$ | $58.8\pm0.5$ |
| IV | $9.53<R_7<10.53$ $R_8=\infty$ | $1096<S_4<1212$ | $3.8<t_4<4.2$ | $1.6170\pm.0015$ | $36.6\pm0.3$ | wherein the dimensions are given in units and $N_d$ and $\nu$ are the index of refraction and the reciprocal dispersion respectively. The variations provided for in Table III should be made along with technical compensations for such variations.

A second preferred embodiment of the invention has a power of 100× and an equivalent focal length of 11.7 mm. The constructional data for this system is set forth with respect to Table V.

TABLE V $$\sum_{R_1}^{R_8}\left(\frac{1}{R_1}+\frac{1}{R_2}+\cdots\frac{1}{R_8}\right)=-.125$$

| Lens | Radii | Spacing | Thickness | $N_d$ | $\nu$ |
|---|---|---|---|---|---|
| I | $R_1=16.68$ | $S_1=33.3$ | $t_1=2.5$ | 1.5725 | 57.40 |
| II | $-R_2=6.69$ $-R_3=6.69$ $-R_4=40.51$ | | $t_2=1.1$ | 1.6170 | 36.6 |
| III | $-R_5=16.58$ | $S_2=22.0$ $S_3=28.0$ | $t_3=1.0$ | 1.6110 | 58.8 |
| IV | $R_6=10.03$ $R_7=10.03$ $R_8=\infty$ | $S_4=1154.5$ | $t_4=4.0$ | 1.6170 | 36.6 |

Even though the invention has been illustrated by means of various embodiments, it should be understood that these embodiments are given as examples and are not to be construed as limitations. It is apparent that the present invention may be modified and understood in different forms without departing from the scope of the appended claims.

What is claimed is:

1. A projection lens system for magnifying the size of a projected image comprising four lens elements combined into two compound components which have the following constructional data:

$$\sum_{R_1}^{R_8}\left(\frac{1}{R_1}+\frac{1}{R_2}+\cdots\frac{1}{R_8}\right)=-.125$$

| Lens | Radii | Spacing | Thickness | $N_d$ | $\nu$ |
|---|---|---|---|---|---|
| I | $R_1=16.68$ | $S_1=33.3$ | $t_1=2.5$ | 1.5725 | 57.40 |
| II | $-R_2=6.69$ $-R_3=6.69$ $-R_4=40.51$ | | $t_2=1.1$ | 1.6170 | 36.6 |
| III | $-R_5=16.58$ | $S_2=22.0$ $S_3=28.0$ | $t_3=1.0$ | 1.6110 | 58.8 |
| IV | $R_6=10.03$ $R_7=10.03$ $R_8=\infty$ | $S_4=1154.5$ | $t_4=4.0$ | 1.6170 | 36.6 | wherein $N_d$ and $\nu$ are the index of refraction and the reciprocal dispersion ratio respectively, $S_1$ is the spacing from the first component to the object, $S_2$ plus $S_3$ is the spacing between the two components, and $S_4$ is the spacing from the second component to the image plane.

2. A projection lens system for magnifying the size of a projected image comprising four lens elements combined into two compound components which have the following constructional data:

$$\sum_{R_1}^{R_8}\left(\frac{1}{R_1}+\frac{1}{R_2}+\cdots\frac{1}{R_8}\right)=-.125$$

| Lens | Radii | Spacing | Thickness | $N_d$ | $\nu$ |
|---|---|---|---|---|---|
| I | $R_1=16.68$ | $S_1=28.0$ | $t_1=2.5$ | 1.5725 | 57.40 |
| II | $-R_2=6.69$ $-R_3=6.69$ $-R_4=40.51$ | | $t_2=1.1$ | 1.6170 | 36.6 |
| III | $-R_5=16.58$ | $S_2=22.0$ $S_3=90.0$ | $t_3=1.0$ | 1.6110 | 58.8 |
| IV | $R_6=10.03$ $R_7=10.03$ $R_8=\infty$ | $S_4=1093$ | $t_4=4.0$ | 1.6170 | 36.6 | wherein $N_d$ and $\nu$ are the index of refraction and the reciprocal dispersion ratio respectively, $S_1$ is the spacing from the first component to the object, $S_2$ plus $S_3$ is the spacing between the two components, and $S_4$ is the spacing from the second component to the image plane.

References Cited

UNITED STATES PATENTS 873,898    12/1907    Rudolph et al. _____ 350—232

JEWELL H. PEDERSEN, *Primary Examiner.*

JOHN K. CORBIN, *Examiner.*

UNITED STATES PATENT OFFICE
CERTIFICATE OF CORRECTION

Patent No. 3,348,902                      October 24, 1967

Ralph K. Dakin

It is certified that error appears in the above identified patent and that said Letters Patent are hereby corrected as shown below:

Column 3, line 20, "$S_2$" should read -- $S_3$ --. Columns 3 and 4, Table II, second column, lines 2 and 3 thereof, "$R_2 < -7.2$" and $R_3 < -7.2$" should read -- $R_2 < -7.02$ -- and -- $R_3 < -7.02$ --.

Signed and sealed this 18th day of November 1969.

(SEAL)
Attest:

Edward M. Fletcher, Jr.                WILLIAM E. SCHUYLER, JR.
Attesting Officer                         Commissioner of Patents